United States Patent [19]

Swallow

[11] Patent Number: 5,170,730

[45] Date of Patent: Dec. 15, 1992

[54] SEED PLANTER FOR CONTINUOUSLY PLANTING PLOTS USING DIFFERENT SEED SOURCES

[75] Inventor: Clarence Swallow, Manhattan, Kans.

[73] Assignee: Kansas State University Research Foundation, Manhattan, Kans.

[21] Appl. No.: 689,318

[22] Filed: Apr. 22, 1991

[51] Int. Cl.⁵ ............................................. A01C 7/00
[52] U.S. Cl. .................................. 111/174; 111/903; 111/170; 111/177
[58] Field of Search ................. 111/170, 14, 250, 900, 111/174, 177, 903

[56] References Cited

U.S. PATENT DOCUMENTS

| | | | |
|---|---|---|---|
| 3,855,953 | 12/1974 | Fathauer et al. | 111/903 |
| 3,881,637 | 5/1975 | Loesch et al. | 111/903 |
| 3,927,400 | 12/1975 | Knepler | 111/903 |
| 3,928,751 | 12/1975 | Fathauer | 111/903 |
| 3,999,690 | 12/1976 | Deckler | 111/63 |
| 4,085,862 | 4/1978 | Steffen | 111/903 |
| 4,109,824 | 8/1978 | Davis | 111/903 |
| 4,137,529 | 1/1979 | Anson et al. | 111/903 |
| 4,145,980 | 3/1979 | Boots | 111/903 |
| 4,156,395 | 5/1979 | Edwards et al. | 111/170 |
| 4,413,685 | 11/1983 | Gremelspacher et al. | 111/14 |
| 5,025,951 | 6/1991 | Hook et al. | 111/177 |

FOREIGN PATENT DOCUMENTS

| | | | |
|---|---|---|---|
| 3218839 | 8/1983 | Fed. Rep. of Germany | 111/14 |
| 1242015 | 7/1986 | U.S.S.R. | 111/903 |
| 1274638 | 12/1986 | U.S.S.R. | 111/903 |
| 1344268 | 10/1987 | U.S.S.R. | 111/903 |
| 2015199 | 9/1979 | United Kingdom | 111/903 |

Primary Examiner—Dennis L. Taylor
Assistant Examiner—Spencer Warnick
Attorney, Agent, or Firm—Hovey, Williams, Timmons & Collins

[57] ABSTRACT

A mobile seed planter includes a plurality of planting assemblies with each of the assemblies being selectively activatable for planting seeds and including structure defining a seed cavity for receiving seeds to be planted. A discharging structure in communication with the seed cavities receives seeds therefrom for discharging seeds onto the ground. A control assembly, operably coupling the planting assemblies, includes structure for selectively activating one of the planting assemblies and for preventing activation of the other of the planting assemblies thereby limiting the discharging of seeds onto the ground to only one of the planting assemblies at a time.

10 Claims, 9 Drawing Sheets

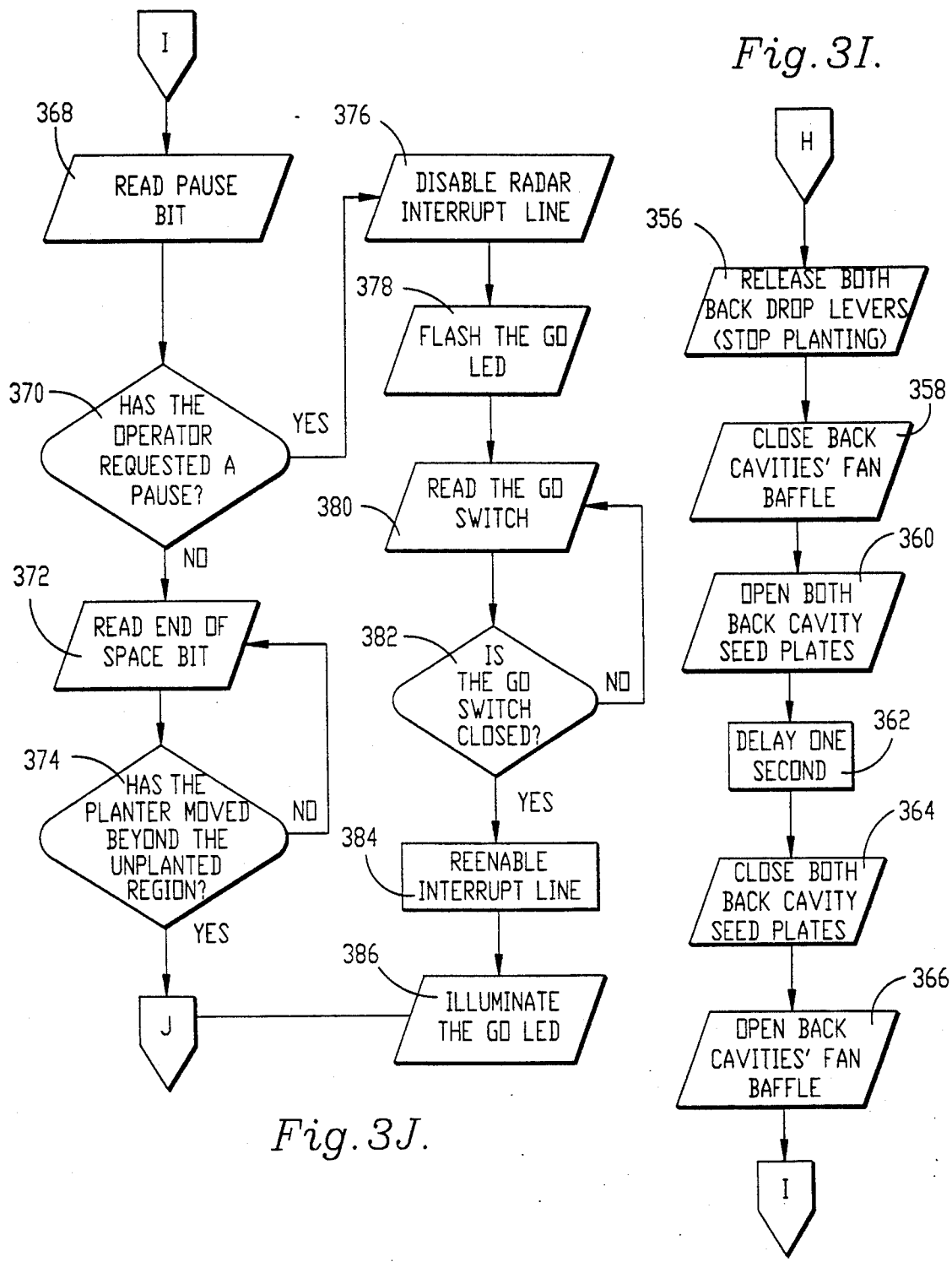

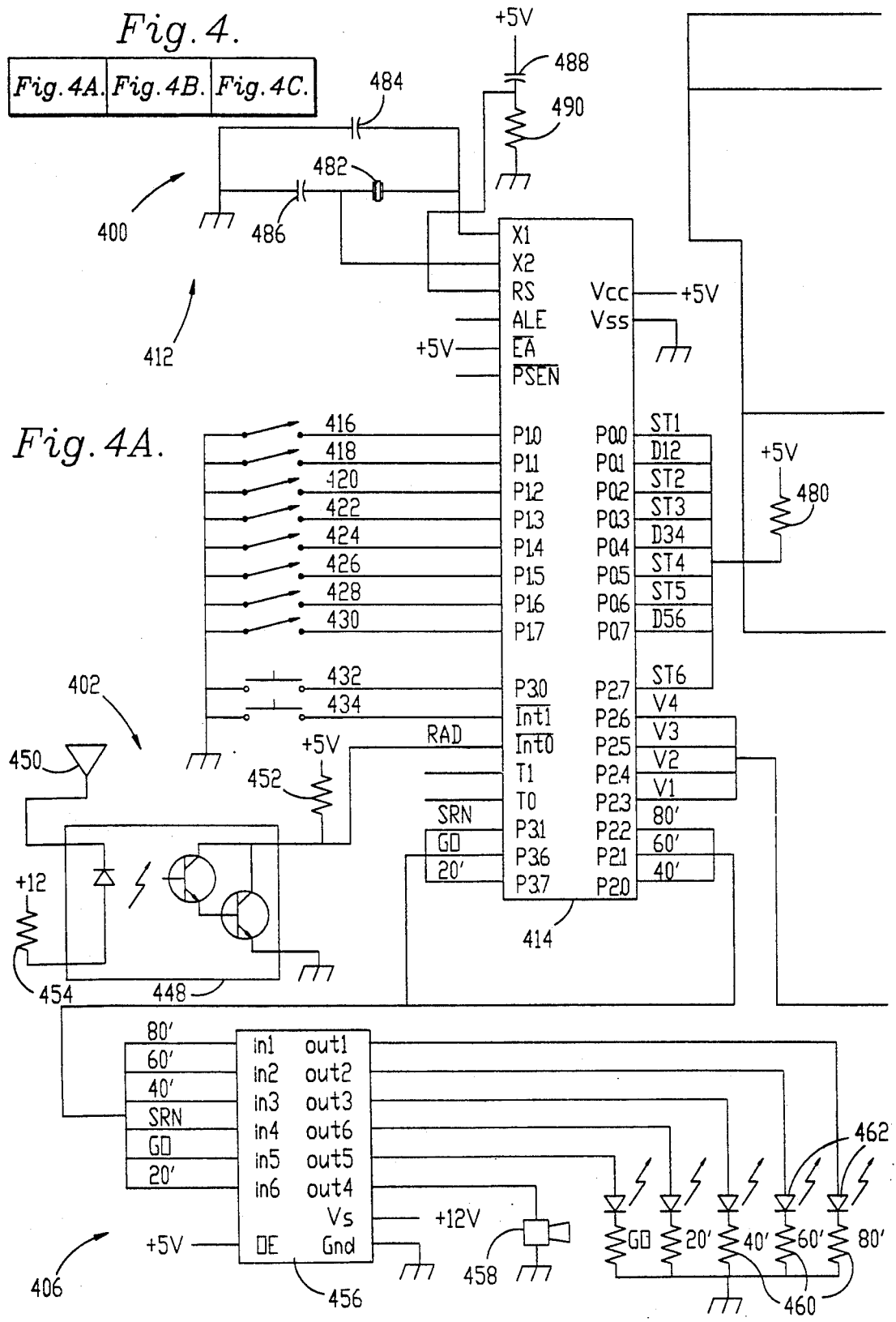

SEED PLANTER FOR CONTINUOUSLY PLANTING PLOTS USING DIFFERENT SEED SOURCES

BACKGROUND OF THE INVENTION

1. Field of the Invention

The present invention generally relates to an agricultural seed planter and, more particularly, to a microprocessor controlled seed planter for continuously planting plots from different seed sources.

2. Description of the Prior Art

The use of seed planters for agricultural purposes is well known. These planters typically are used to plant an entire field with a single type of seed. There are, however, instances where it is desirable to plant a variety of seed types in the same field. For example, in research applications it is often desirable to plant a few rows of several genera of seed in order to evaluate the performances of each genus.

Obviously each type of seed must be planted without contamination by any other type of seed. To do this, the seeds of a previous plot must be removed from the planter before new seed is loaded into the planter and subsequently planted. One approach to accomplishing this has been to provide a planter with means for continuing to deposit seeds onto the ground while the planter is stationary. In this way the planter can be stopped at the end of planting one type of seed and nay excess seed left in the planter is deposited on the ground at the end of the row and then the new type of seed to be planted is loaded into the planter. A problem with the above approach is that this process is time consuming and burdensome because it requires the planter to be stopped at the end of every row to clean out the excess seed and load new seed.

Another approach which has been employed to plant multiple varieties of seeds in the same field is the use of cone planters. All the seeds in a cone planter are planted after one revolution of the cone and then new seeds are loaded to be planted in the next plot. In this way continuous planting of a variety of seeds is accomplished. The major problem with this approach, however, is that there is not an even distribution of seeds. Therefore, it is common to over plant the seed plots and then later return and physically thin the plots of excess plants. This approach is time consuming, labor intensive and may result in damage to the plants remaining in the field.

SUMMARY OF THE INVENTION

The problems outlined above are solved and an advance in the state of the art provided by the seed planter of the present invention. More particularly, the planter hereof allows the planting of plots of different varieties of seed without stopping the planter to clean out the old seed or to load new seed and which plants one seed at a time at known distances.

The preferred seed planter broadly includes a plurality of planting assemblies with each of the assemblies selectively activatable for planting seeds. Each assembly includes structure defining a seed cavity for receiving seeds to be planted and a discharging apparatus in communication with each of the seed cavities for receiving seeds therefrom for discharging seeds onto the ground. A control assembly is operably coupled with the planting assemblies for controlling the planting assemblies including apparatus for selectively activating one of said planting assemblies and for preventing activation of the others of said assemblies thereby limiting the discharging of seeds onto the ground to only one of the planting assembles at a time.

BRIEF DESCRIPTION OF THE DRAWING

FIG. 3I is the ninth portion of the computer program flowchart for controlling the operation of the preferred seed planter;

FIG. 3J is the tenth portion of the computer program flowchart for controlling the operation of the preferred seed planter; and FIGS. 4A-D is a schematic diagram of the electrical system of the preferred seed planter in accordance with the present invention.

DESCRIPTION OF THE PREFERRED EMBODIMENT

Mechanical Aspects

Figure 1:
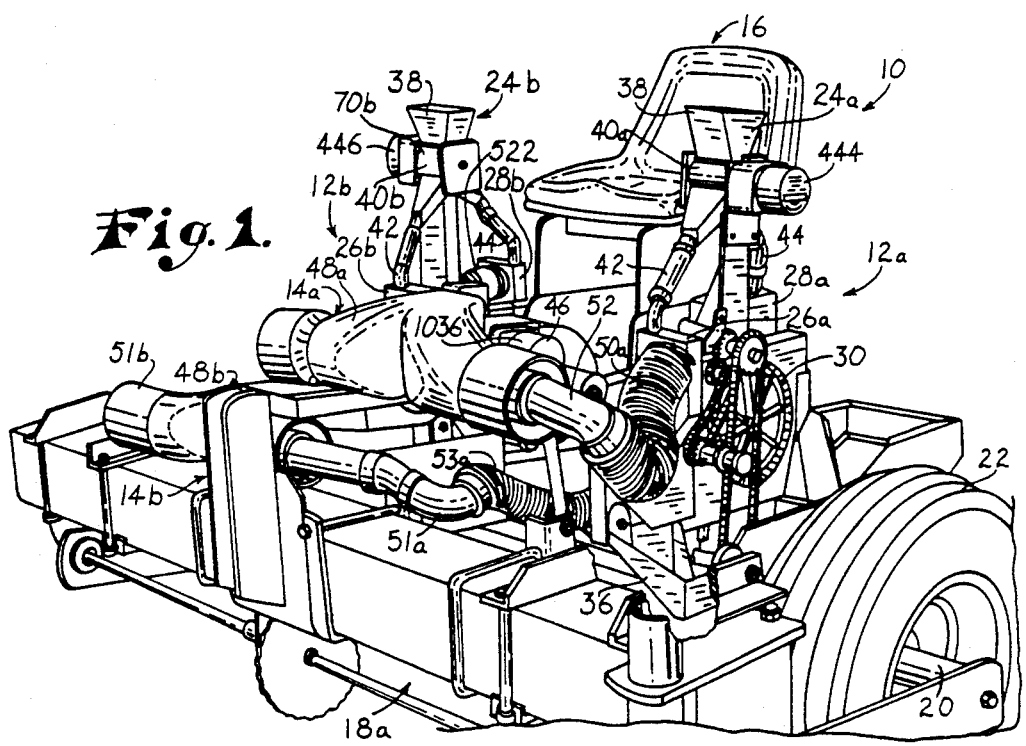
FIG. 1 is a partial perspective view of the preferred seed planter in accordance with the present invention.
Figure 2:
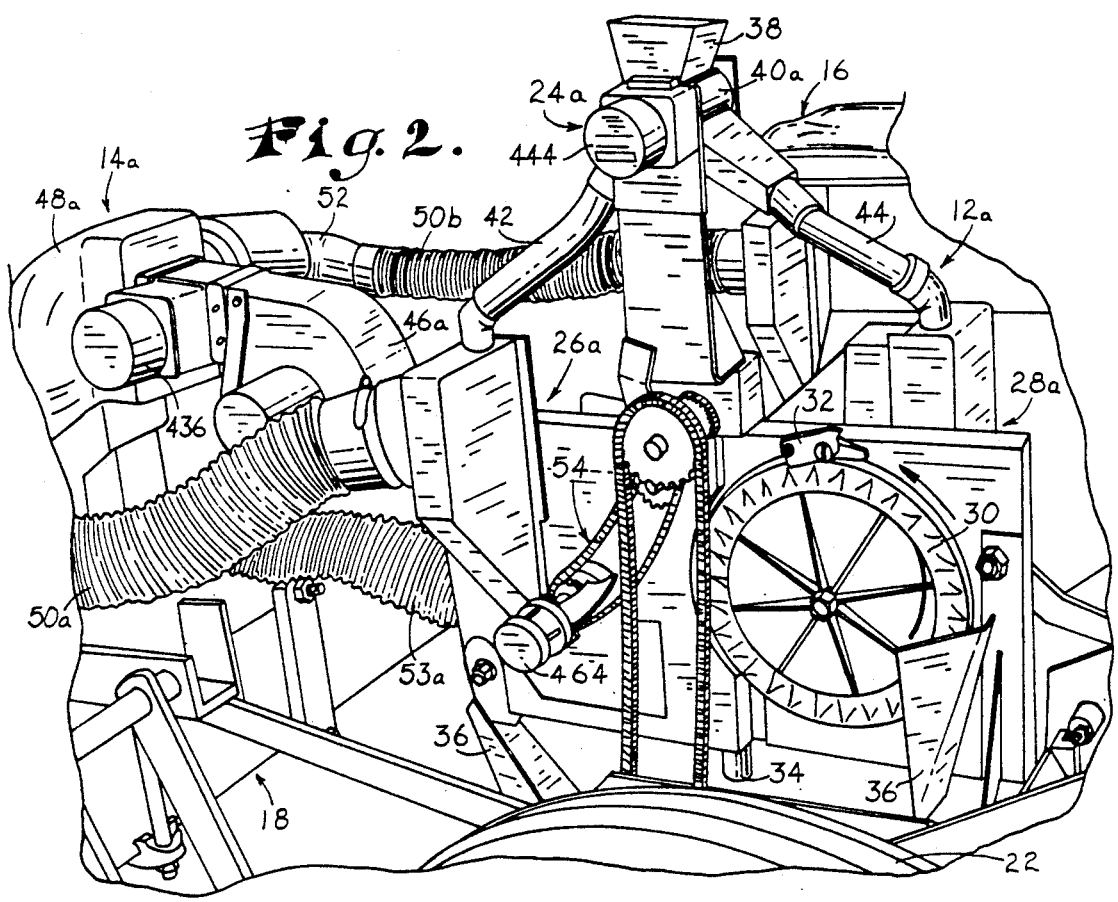
FIG. 2 is a partial perspective view of the preferred seed planter in accordance with the present invention.
Figure 3A:
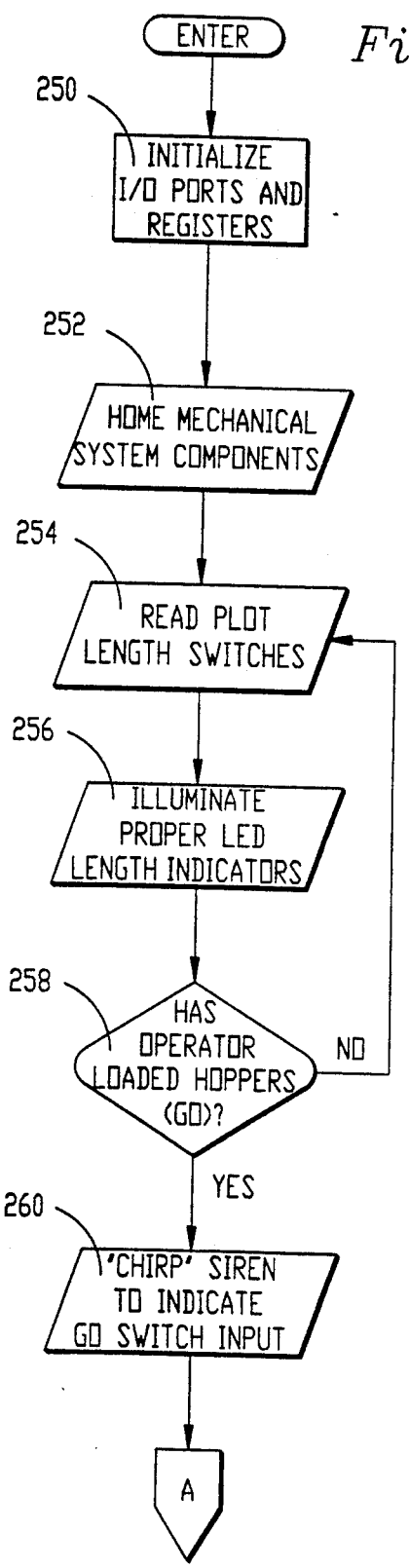
FIG. 3A is the first portion of the computer program flowchart for controlling the operation of the preferred seed planter.
Figure 3B:
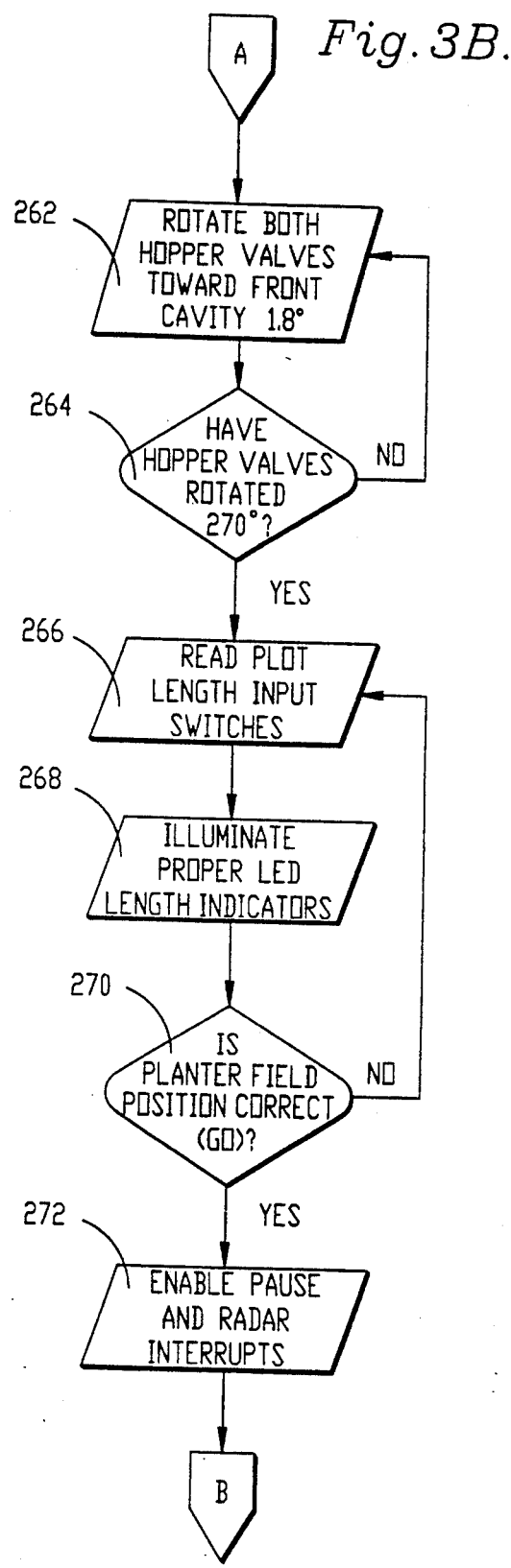
FIG. 3B is the second portion of the computer program flowchart for controlling the operation of the preferred seed planter.
Figure 3C:
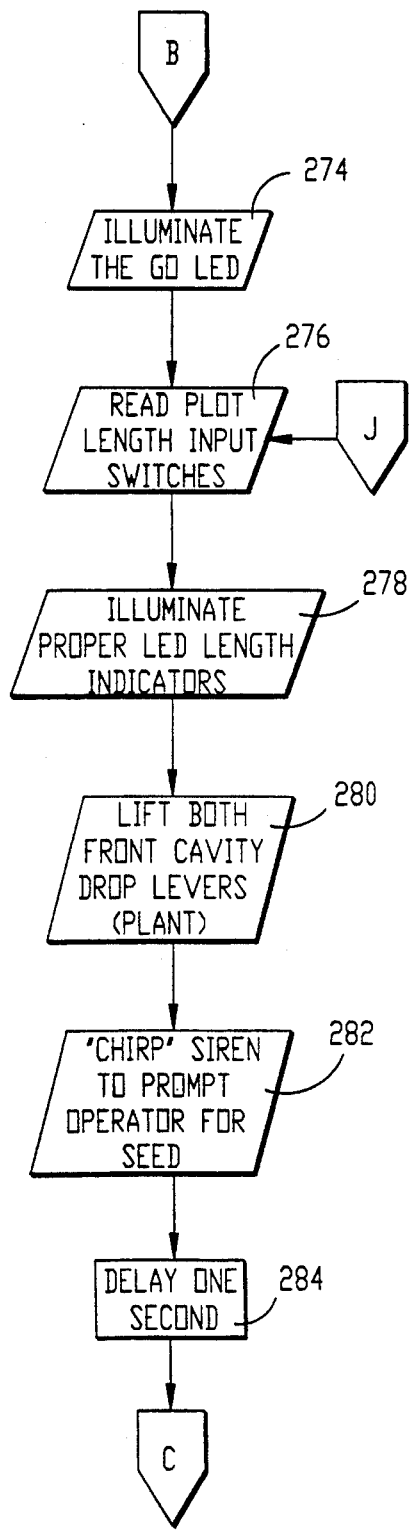
FIG. 3C is the third portion of the computer program flowchart for controlling the operation of the preferred seed planter.
Figure 3D:
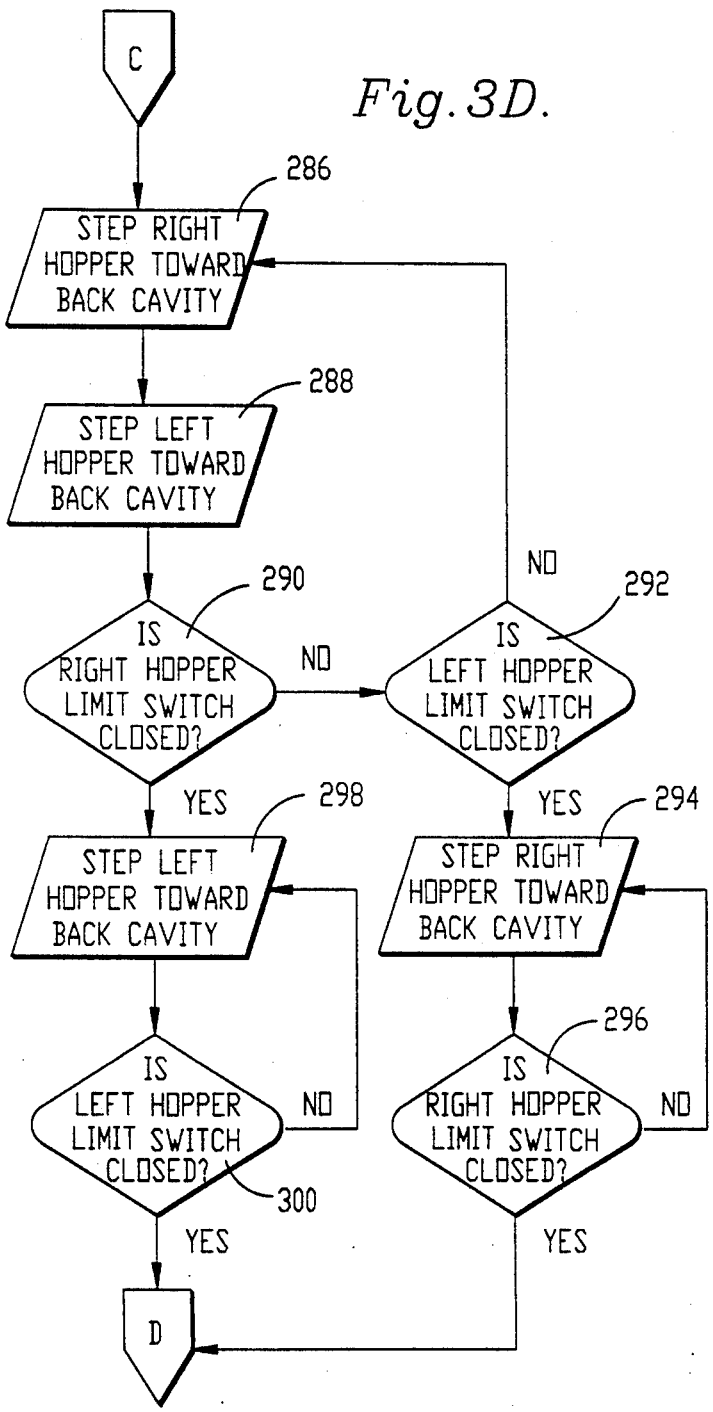
FIG. 3D is the fourth portion of the computer program flowchart for controlling the operation of the preferred seed planter.
Figure 3E:
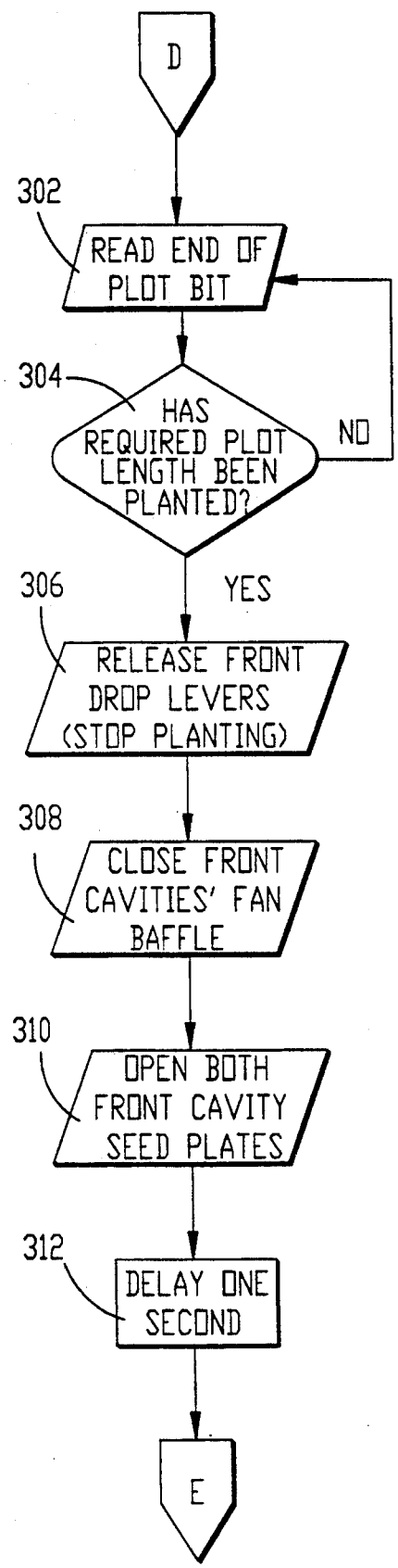
FIG. 3E is the fifth portion of the computer program flowchart for controlling the operation of the preferred seed planter.
Figure 3F:
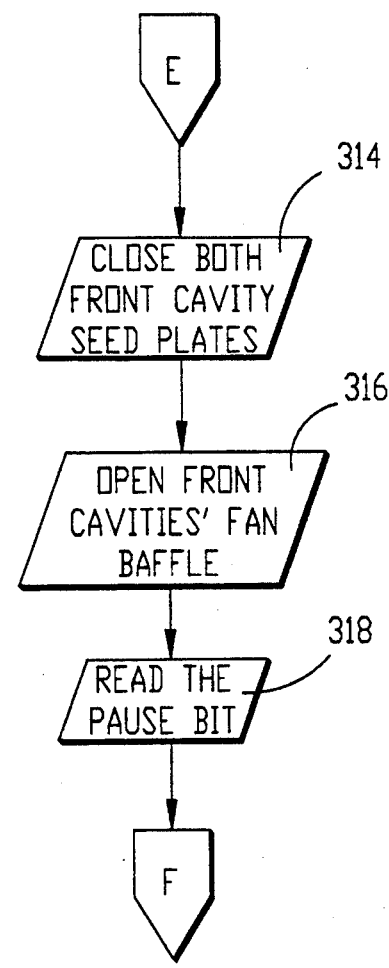
FIG. 3F is the sixth portion of the computer program flowchart for controlling the operation of the preferred seed planter.
Figures 3G, 3H:
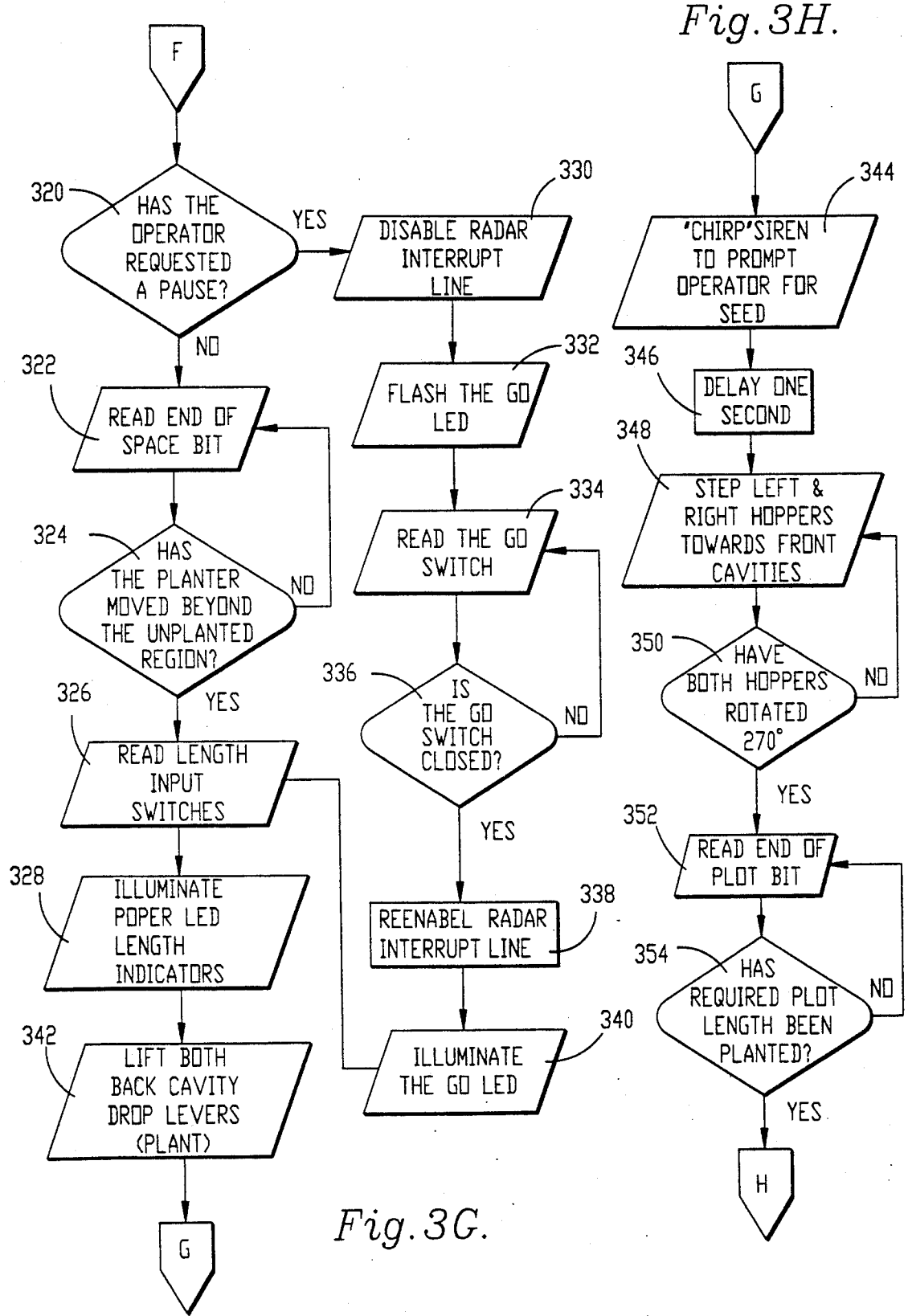
FIG. 3G is the seventh portion of the computer program flowchart for controlling the operation of the preferred seed planter.
FIG. 3H is the eighth portion of the computer program flowchart for controlling the operation of the preferred seed planter.

Referring now to the drawing figures, a seed planter 10 in accordance with the invention broadly includes structure defining left and right planting assemblies 12a and 12b, two blower assemblies 14a and 14b, an operator seat 16 and a chassis 18. Assemblies 12a,b and 14 and seat 16 are connected to chassis 18 which is attached to axle 20 and drive wheels 22 (only one shown).

In more detail, each planting assembly 12 includes a hopper assemblies 24a,b, structure defining a front seed cavities 26a,b and back seed cavities 28a,b, two seed plates 30 (only one shown), two drop drop levers 32 (only one shown), a drop chute 34, and a catch bin 36. Hopper assembly 24a (with assembly 24b being substantially identical) includes a hopper 38, hopper valve 40a and ducts 42 and 44. Duct 42 is connected to front seed cavity 26a with the end of duct 42 passing down into the cavity so that the end is below blower hose 50a, thereby preventing seeds from falling into hose 50 and possibly contaminating a later plot. In the same way, duct 44 is connected to back seed cavity 28a. A seed plate 30 is rotatably attached to each of seed cavities 26 and 28 and preferably of the type described in U.S. Pat. No. 3,999,690 which is hereby incorporated by reference.

Each seed plate 30 has a shiftable drop lever 32 which is located directly above seed plate 30. Drop chute 34 is located between front seed cavity 26 and back seed cavity 28 such that it is in communication with both of the cavities 26 and 28 and catch bin 36 is located immediately below seed plates 30.

Blower assemblies 14a includes a blower 46a, baffle 48a and two blower hoses 50a and 50b. Blower 46a is connected to baffle 48a which has two outlet pipes 52a and 52b and a blower hoses 50a,b are connected to each of pipes 52a and 52b respectively. Each of blower hoses 50a,b of blower assembly 14a is connected to front seed cavities 26 of left and right planting assemblies 12a,b. Blower assembly 14b is similarly connected to back seed cavities 28a,b by way of baffle 48b, pipes 51a and 51b, and hoses 53a and 53b.

In the operation of the mechanical portions of planter 10, an operator is seated between planting assemblies 12a,b in seat 16 and deposits the seeds to be planted first into hoppers 38. The hopper valves 40a,b are then rotated towards front seed cavities 26 so that seeds will fall by gravity via ducts 42 into seed cavities 26. Similarly, the operator then loads the seeds to be planted second into hoppers 38 and these seeds fall into back seed cavities 28. Blower assemblies 14a,b supply air pressure to front seed cavities 26 and back seed cavities 28 respectively.

When planter 10 is pulled, drive wheels 22 cause seed plates 30 to rotate via chain assemblies 54 which are connected to planting assemblies 12a,b such that each seed plate 30 rotates towards the drop chute 34 from above drop chute 34. The means by which the seeds to be planted are conveyed from seed cavities 26 and 28 is well known in the art and described in U.S. Pat. No. 3,999,690 and therefore will not be discussed in great detail here. In general, the air pressure in the seed cavities 26 and 28 holds seeds in the pockets of seed plates 30 until each pocket is rotated to a position above drop chute 34 where the air pressure is removed, thereby allowing the seed to fall to the ground via drop chute 34.

The construction of planting assemblies 12 is such that seeds are being picked up and held in the pockets of seed plates 30 of front and back seed cavities 26 and 28 simultaneously. However, it is necessary that only the seeds from either the front seed cavities 26 or the back seed cavities 28 are planted at any given time. To prevent the seeds of a cavity from being planted, drop lever 32 is placed against the seed plate 30 which then removes the air pressure from the seed plate pockets which are directly below drop lever 32. This allows the seeds in those pockets to fall back to the bottom of the seed cavity. In this way, when drop lever 32 is against the seed plates 30, no seeds are delivered to drop chute 34. The control and detailed explanation of the operation of seed planter 10 is given below.

Electrical System

Figure 4B:
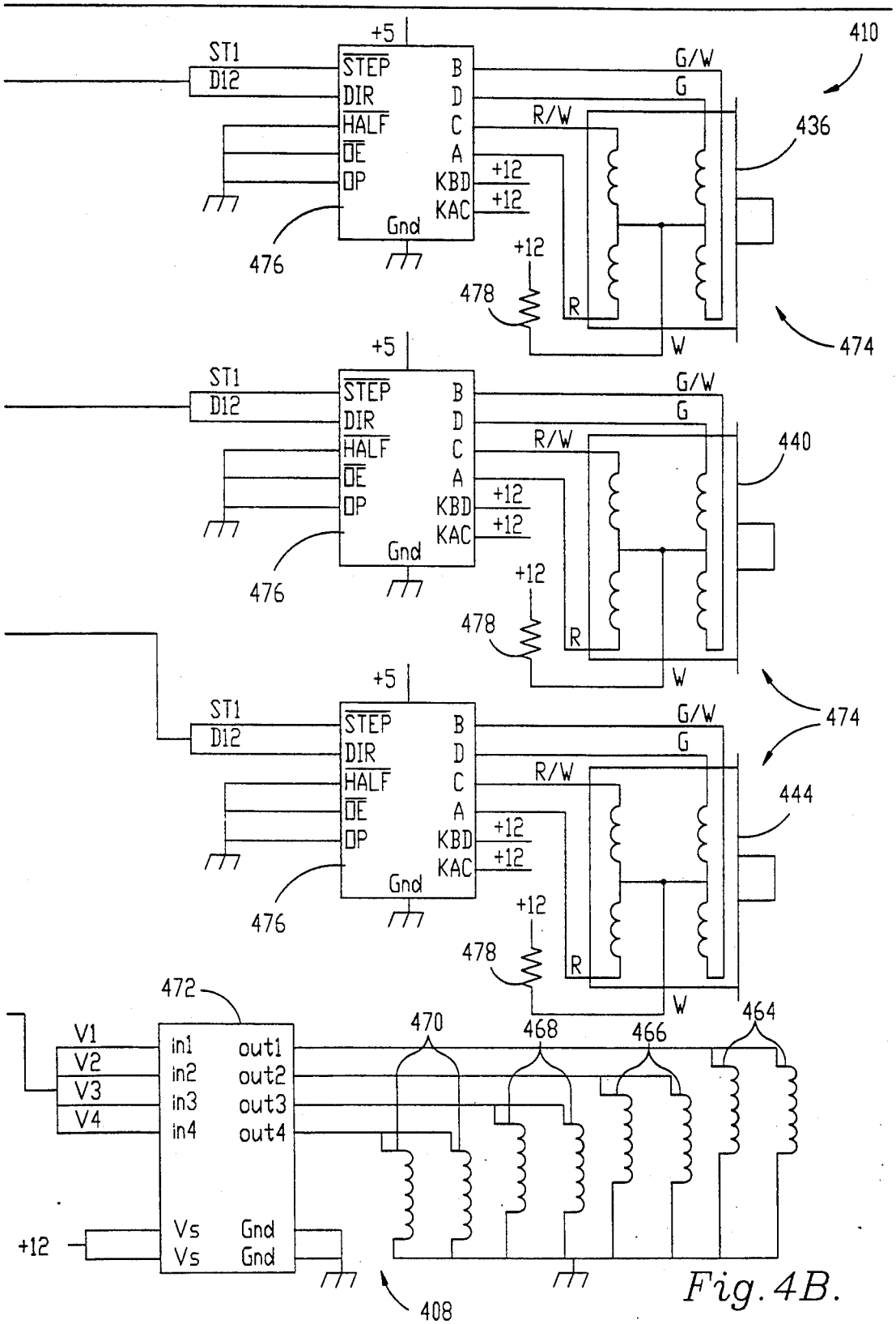
Figure 4C:
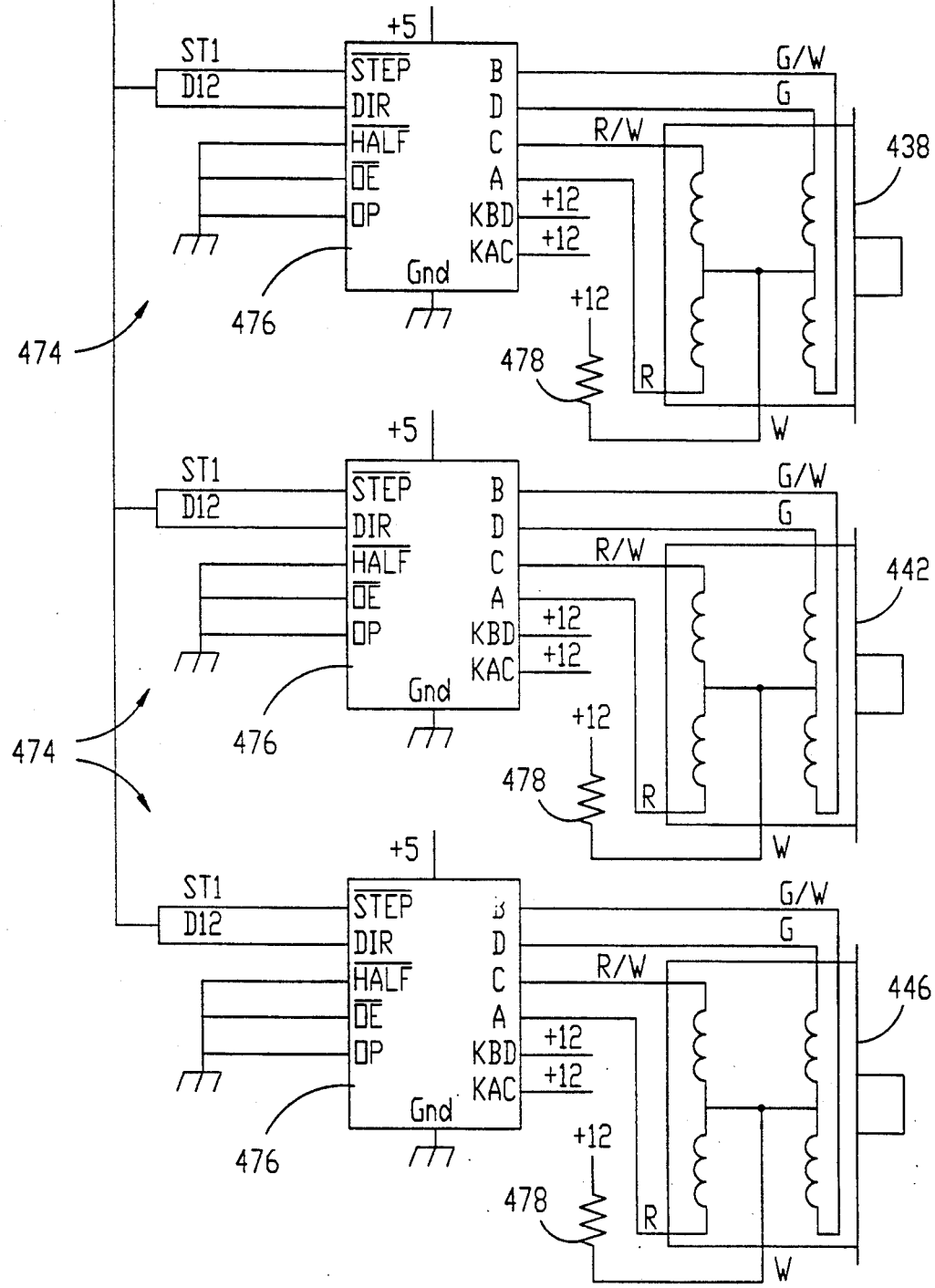

FIG. 4 is a schematic diagram of the preferred electrical system 400 of seed planter 10, in accordance with the present invention. The electrical system includes inputs 402, radar input 404, display circuit 406, valve circuit 408, stepper motor circuits 410, oscillator circuit 412 and microcomputer 414. Electrical system 400 controls a two row planter in accordance with the present invention as described above. As those skilled in the art will appreciate, the microcomputer could be utilized to control the planting of more or fewer rows without departing from the scope of the invention hereinafter described.

In general, microcomputer 414 (preferably an Intel 8751H) receives signal data needed to control the operation of the planter components form limit switches (not shown) 416, 418, 420, 422, 424 and 426, plot length switches (not shown) 428 and 430, Go switch 432, Pause switch 434 and radar input 404.

Additionally, a conventional power supply (not shown) is provided for supplying stable filtered +5 v.d.c. power to all the integrated circuits and at +12 v.d.c. to source driver 472. Advantageously, the power supply receives its input power from the electrical system of the tractor pulling seed planer 10, typically at +12 v.d.c.

Limit switches 416–426 are each attached to stepper motors 436–446 respectively for providing microcomputer 414 with rotational position information for each stepper motor. One side of each of limit switches 416–426 is connected to ground; the other sides are connected to microcomputer 414 at ports 1.0–1.5, respectively.

Stepper motors 436, 438, 444 and 446 are each operably connected to blower baffles 48a,b and hopper valves 40a,b respectively, as shown in FIG. 1. Thus, by tracking the rotational position of the stepper motors microcomputer 414 can determine the rotational position of baffles 48a,b and hopper valves 40a,b above.

One side of plot length switches 428 and 430, Go switch 432 and Pause switch 434 are connected to ground. The other sides of these switches are connected to ports P1.6, P1.7, and P3.0 and Int1 of microcomputer 414, respectively. Preferably, all the above switches are normally open switches with Go switch 432 and Pause switch 434 also being momentary switches. These switches are mounted on a control panel (not shown) and positioned on the seed planer for use by the operator.

The final input to microcomputer 414 is radar input 404 and consists of photon coupled isolator 448 (General Electric 4N33), radar ground speed sensor 450 (available from Dickey-John Corp, not shown) and two resistors 452 and 454. Sensor 450 is connected to the cathode pin of isolator 448 and the anode pin thereof is connected to one side of resistor 454 (1K ohms). The other side of resistor 454 is connected to +12 v.d.c. The emitter pin of isolator 448 is connected to ground while the collector pin thereof is connected to Int0 of microcomputer 414 and to one side of resistor 452 (100K ohms). The other side of resistor 452 is connected to +5 v.d.c.

Display circuit 406 includes source driver 456 (Sprague UDN-2987A), siren 458, resistors 460 (22 ohms) and LEDs 462. Preferably, one of LEDs 462 is green in color to indicate a "Go" signal. Microcomputer 414 controls the operation of siren 458 and LEDs 462 through source driver 456.

Ports P2.0, P2.1, P2.2, P3.1, P3.7 and P3.6 of microcomputer 414 are connected to ports in1-in6 of source driver 456, respectively. One side of LEDs 462 and siren 458 are connected to source driver 456 ports out1-out6 corresponding to ports in1-in6. The other sides of LEDs 462 are connected to one side of resistors 460. The opposite sides of resistors 460 and the other side of siren 458 are connected to ground. Source driver 456 is connected to a +12 v.d.c. supply and the OE port thereof is connected to +5 v.d.c. LEDs 462 are mounted on the control panel with the input switches disclosed above.

Valve circuit 408 includes solenoid controlled pneumatic valves 464-470 and source drive 472 (Sprague UDN-2944W) which is connected to +12 v.d.c. Microcomputer 414 ports 2.3-2.6 are connected to input terminals in1-in4 of source driver 472 and source driver 472 output terminals out1-out4 are connected to one side of valves 464-470, respectively. The other side of valves 464-470 are connected to ground. Source drive 472 is connected to +12 v.d.c. Valves 464-470 are operably connected to each of drop levers 32 and seed plates 30 (connections not shown).

Stepper motor circuits 410 includes six identical circuits 474. Stepper motors 436-446 are each connected to a driver 476 (Sprague UCN-5804B). Also connected to stepper motors 436, 438 (not shown) 444 and 446 are blower baffles 48a,b and hopper valves 40a,b (connections not shown). Stepper motors 440 and 442 are available for expansion and in this description are not used.

Phase A leads (red and red/white wires) of stepper motors 436-446 are connected to outputs a and c of drivers 476 and phase B leads (green and green/white wires) are connected to outputs b and d. The power leads (white wires) of stepper motors 436-440 are connected to one side of resistors 478 (7.5 ohms, 10 watts). The other side of resistors 478 are connected to +12 v.d.c. Ports KBD and KAC of driver 476 are also connected to +12 v.d.c.

The step and direction inputs of drivers 476 are connected to microcomputer 414 ports 0.0-0.7 and 2.7 and to one side of resistors 480 (4.7K ohms), as shown in FIG. 4. The other side of resistors 480 are connected to +5 v.d.c. The half, OE, OP and ground ports of drivers 476 are all connected to ground.

Oscillator circuit 412 is connected to ports X1 and X2 of microcomputer 414. These ports are the input and output, respectively, of an inverting amplifier in microcomputer 414. Port X1 is connected to one side of crystal 482 (4 M Hz) and one side of capacitor 484 (30 pF). Port X2 is connected to the other side of crystal 482 and to one side of capacitor 486 (30 pF). The other sides of capacitors 484 and 486 are connected to ground.

Finally, the reset port (RS) of microcomputer 414 is connected to one side of capacitor 488 and one side of resistor 490. The other side of capacitor 488 is connected to +5 v.d.c. and the other side of resistor 490 is connected to ground.

FIGS. 3A-J are computer program flowcharts illustrating the seed planter program for operating the microprocessor. In general, these figures are the flowchart to control the operation of seed planter 10. Turning now to the details of the flowchart, the explanation herein assumes the seed planter is plating two rows of like distances at a time. The operating program enters at step 250 which initializes the input and output ports and registers of microcomputer 414. This initialization is used by the assembler.

Next, step is 252 "homes" all the mechanical system components. That is to say, the stepper motors are rotated until limit switches 416-426 are closed, pneumatic valves 464-470 are closed, and siren 458 and Go LED 462 are turned off. Next, the seed cavities are cleaned out and hopper valves 40a,b are positioned to dump to the front cavity. Finally, a double chirp is sounded by siren 458 to alert the operator that the system is ready for seeds to be dumped into left and right hoppers 38.

In step 254, microcomputer 414 reads plot length switches 428 and 430. The program next moves to step 256 which illuminates the proper LED 462 indicators on the control panel to reflect the plot lengths selected. Step 258 asks whether the operator has loaded seeds into hopper 38, which is indicated by the operator pressing Go switch 432. The program continues to loop through steps 254-258 until Go switch 432 is pressed.

Once Go switch 432 is pressed, step 260 turns on siren 458 for a very short time creating a "chirp" to indicate to the operator that Go switch 432 has been pressed. Step 262 then rotates both hopper valves 40a,b in successive increments of 1.8 degrees. Step 264 then asks if hopper valves 40 have rotated 270 degrees. If no, the program loops through steps 262 and 264 until hopper valves 40 have rotated 270 degrees.

When hopper valves 40a,b have rotated the proper amount, step 266 reads plot length switches 426 and 428 and step 268 illuminates the proper LED indicators 462. Step 270 then asks if seed planter 10 is correctly positioned on the field. The correct position is indicated by the operator again pressing Go switch 432. The program continues to loop through steps 266-270 until Go switch 432 is pressed.

Next, step 272 enables microcomputer 414 pause and radar interrupts, Int1 and Int0 respectively. Step 274 then illuminates Go LED 462, to inform the operator that seed planter 10 is planting.

Step 276 again reads plot length input switches 428 and 430 and step 278 illuminates the proper LEDs 462. Steps 280 lifts seed drop levers 32 by activating pneumatic valves 466 and 470. Lifting these drop levers begins planting by seed planter 10.

While front cavities 26 are planting, step 282 chirps siren 458 to prompt the operator to load the seeds to be used in the next plot. Step 284 creates a one second delay. Next, step 286 rotates right hopper valve 40a,b toward back cavity 28 and step 288 rotates left hopper valve 40a toward back cavity 28.

Step 290 asks whether limit switch 424 is closed. If no, the program proceeds to step 292 which asks whether limit switch 426 is closed. If yes, step 1246 rotates stepper motor 444 (and hence, hopper valve 40b) toward back cavity 28. Step 296 then asks whether limit switch 424 is closed, and the program repeats steps 294 and 296 until switch 424 is closed.

If step 290 determines that switch 424 is closed, the program proceeds to step 298 which rotates stepper motor 446 toward back cavity 28. Step 300 then asks whether limit switch 426 is closed. The program loops through steps 298 and 300 until switch 426 is closed. If steps 290 and 292 determine that limit switches 424 and 426 are not closed, the program will loop back through steps 286-292 until one of limit switches 424 and 426 is closed.

When limit switches 424 and 426 are closed step 302 reads the end of plot bit. Next, step 304 asks whether the required plot length has been planted. The program will repeat steps 302 and 304 until the required length has been planted. Microcomputer 414 determines the length seed planter 10 has traveled by evaluating signal data from radar input 404.

When step 304 determines that the required plot length has been planted, step 306 releases front drop levers 32 which stops the planting by front cavities 26. Step 308 then closes baffle 48a to remove air pressure from front cavities 26 by rotating stepper motor 436 and step 310 opens front cavity 26 using pneumatic valve 464 to push seed plate 30 away from cavities 26. That is to say, activation of valve 464 axially shifts seed plate 30 outwardly which allows seeds in the plate pockets and seeds in cavity 26 to fall downwardly where they are collected by catch bin 36. Step 312 then introduces a one second delay which allows the seeds in front cavities 26 to fall into catch bin 36. Step 314 closes front cavities 26.

Step 316 then opens baffle 48a, to repressurize the front cavities, step 318 reads the pause bit and step 320 asks whether the operator has requested a pause, which is done by pressing Pause switch 434, which sets the pause bit. If no pause has been requested, then step 322 reads the end of space bit, which determines the space to be left unplanted between plots. The amount of space to be left unplanted between plots is set in step 250.

Next, step 324 asks whether seed planter 10 has moved beyond the unplanted region. The program loops through steps 322 and 324 until seed planter 10 has moved the required distance.

Referring back to step 320 if the operator has requested a pause the program proceeds to step 330 which disables the radar interrupt line, Int0. Step 332 then flashes Go LED 462 to indicate that a pause has been requested and that the planter is not planting. Step 334 then reads Go switch 432 and step 336 asks whether switch 432 has been pressed. The program loops through steps 334 and 336 until switch 432 is pressed. Seed planter 10 will finish planting the current plot before responding to a pause request.

When Go switch 432 is closed step 338 reenables radar interrupt line, Int0 and step 340 lights Go LED 462. The program then proceeds to step 326 which reads length input switches 428 and 430, once the planter has moved beyond the unplanted region or Go switch 432 has been pressed subsequent to a pause request.

Step 328 then illuminates the proper LED length indicators 462. Next, step 342 using pneumatic valves 470, lifts drop levers 32 which allows back cavities 28 to plant. Step 344 then chirps siren 458 to prompt the operator for seed and step 346 introduces a one second delay in the program.

After the delay step of 346 step 348 rotates hopper valves 40a,b toward front cavities 26. Step 350 asks whether hopper valves 40a,b have rotated 270 degrees and the program lops through steps 348 and 350 until hopper valves 40a,b have rotated 270 degrees.

After hopper valves 40a,b have been rotated step 352 reads the end of plot bit. Step 354 asks whether the required plot length has been planted and the program loops through steps 352 and 354 until the required length has been planted. The program then proceeds to step 356 which releases back drop levers 30, using pneumatic valves 470. This stops the planting by back cavities 28.

Step 358 then closes baffle 48b to remove the air pressure from back cavities 28 by rotating stepper motor 438. Next, step 360 opens back cavities 28 using pneumatic valves 468 to push seed plates 30 away from cavities 28. A one second delay is then introduced by step 362 which allows the seeds in back cavities 28 to fall into catch bin 36 and step 364 closes back cavities 28 again using pneumatic valves 468.

Step 366 then opens baffle 48b. Next, step 368 reads the pause bit and step 370 asks whether the operator has requested a pause. If no pause has been requested step 372 reads he end of space bit, which determines the space to be left unplanted between plots. Step 374 asks whether the planter has moved beyond the unplanted region. The program will loop through steps 372 and 374 until the planter has moved the required distance.

Referring back to step 370, if the operator has requested a pause the program proceeds to step 376 which disables radar interrupt line, Int0. Step 378 then flashes Go LED 462 to indicate that a pause has been requested and that the planter is not planting. Step 380 then reads Go switch 432 and step 382 asks whether switch 432 has been pressed. The program loops through steps 380 and 382 until switch 432 is pressed.

When Go switch 432 is closed step 384 reenables the radar interrupt line and step 386 lights Go LED 462. The program then loops back to step 276 after the planter has moved beyond the unplanted region or after Go switch 432 has been pressed subsequent to a pause request. The above program is then repeated from step 276 until planting is completed.

As those skilled in the art will appreciate, it is noted that substitutions may be made for the preferred embodiment and equivalents employed herein without departing from the scope of the present invention as recited in the claims. For example, more or fewer rows could be planted at a time or more than the preferred two planting assemblies per row could be employed.

Having thus described the preferred embodiment of the present invention, the following is claimed as new and desired to be secured by Letters Patent:

I claim:

1. In a mobile seed planter, the improvement comprising:
    a plurality of planting assemblies, each of said assemblies being selectively activated for planting seeds and including
        structure defining a seed cavity for receiving seeds to be planted, and
        discharging means in communication with said seed cavity for receiving seeds therefrom for discharging seeds;
    planting structure for a single row in communication with said assemblies for receiving seeds discharged therefrom and for discharging the seeds onto the ground; and
    control means coupled with said assemblies for selectively activating said planting assemblies, said control means including
        means for selectively activating one of said planting assemblies, and
        means for preventing activation of the others of said assemblies during activation of said one of said assemblies thereby limiting said discharging seeds onto the ground to only one of said assemblies at a time,
    said improvement further including means for selectively delivering seeds to said seed cavities.

2. Seed planter as set forth in claim 1, said cleaning means including means for selectively shifting said discharging means for said cavity defining structure for allowing seeds remaining in said cavity to fall therefrom.

3. Seed planter as set forth in claim 2, said discharging means including a rotatable seed plate having a plurality of seed receiving depressions defined therein, said seed planter further including air pressure means for imposing air pressure on said depressions for retaining seed therein, said preventing means including a shiftable drop lever assembly for selectively removing air pressure from said depressions in order to allow seeds retained therein to fall back into said cavity thereby preventing discharging of seeds to said planting structure.

4. The seed planter as set forth in claim 1, said control means further including:
- means for selecting lengths to be planted by said planting assemblies;
- means for loading seeds to be planted into said seed cavity;
- means for sensing the start of planting by one of said planting assemblies;
- means for measuring the length said seed planter has planted; and
- means for terminating the planting by said seed planter when said selected length has been reached.

5. The seed planter as set forth in claim 4, wherein said means further includes a pause means for causing a pause in planting by said assemblies.

6. The seed planter as set forth in claim 4, said control means including a computer.

7. The seed planter as set forth in claim 4, said control means further including display means for displaying said selected lengths to be planted.

8. The seed planter as set forth in claim 1, said means for preventing activation further including a shiftable drop lever adjacent each of said planting assemblies for preventing the deposit of seeds onto the ground.

9. The seed planter as set forth in claim 1, said control means further including a siren means for producing a distinctive sound when one of said planting assemblies is activated.

10. The seed planter as set forth in claim 1, said means for selectively delivering seeds to said seed cavities including:
- at least one inlet hopper,
- at least one airlock valve in communication with said hopper, and
- a plurality of ducts for carrying seeds from said airlock valve to said seed cavities.

* * * * *

UNITED STATES PATENT AND TRADEMARK OFFICE
CERTIFICATE OF CORRECTION

PATENT NO. : 5,170,730
DATED : December 15, 1992
INVENTOR(S) : Clarence Swallow

It is certified that error appears in the above-indentified patent and that said Letters Patent is hereby corrected as shown below:

col. 1, Line 29, change "nay" to --any--.

col. 2, Line 53, change "16 and a chassis 18." to --16, and chassis 18 and 18a.--.

col. 3, Line 17, change "assembly 146" to --assembly 14b--.

col. 6, Line 44, change "1246" to --294--.

col. 5, Line 2, change "reads he" to --reads the--.

Signed and Sealed this

Twenty-sixth Day of October, 1998

Attest:

BRUCE LEHMAN

*Attesting Officer*   *Commissioner of Patents and Trademarks*